(12) United States Patent
Al-Rubaiai et al.

(10) Patent No.: US 12,189,858 B1
(45) Date of Patent: Jan. 7, 2025

(54) HAPTIC ROTARY INPUT

(71) Applicant: Lemon Inc., Grand Cayman (KY)

(72) Inventors: Mohammed Al-Rubaiai, Los Angeles, CA (US); Ali Israr, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/242,181

(22) Filed: Sep. 5, 2023

(51) Int. Cl.
*G06F 3/01* (2006.01)
*G06F 3/0362* (2013.01)

(52) U.S. Cl.
CPC ............ *G06F 3/016* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 2016/0357282 A1* | 12/2016 | Block | G06F 3/14 |
| 2017/0090599 A1* | 3/2017 | Kuboyama | H03K 17/962 |
| 2021/0353226 A1* | 11/2021 | Hiemstra | G06F 3/044 |

* cited by examiner

*Primary Examiner* — Nicholas J Lee
(74) *Attorney, Agent, or Firm* — Faegre Drinker Biddle & Reath LLP

(57) ABSTRACT

A rotary input for an electronic device is described. The rotary input comprises a housing, a haptic actuator engaged with the housing, and a slip ring. The haptic actuator is configured to rotate about an axis passing through the electronic device responsive to a user action that manipulates the housing. The slip ring is configured to transfer electrical power from the electronic device to the haptic actuator.

20 Claims, 8 Drawing Sheets

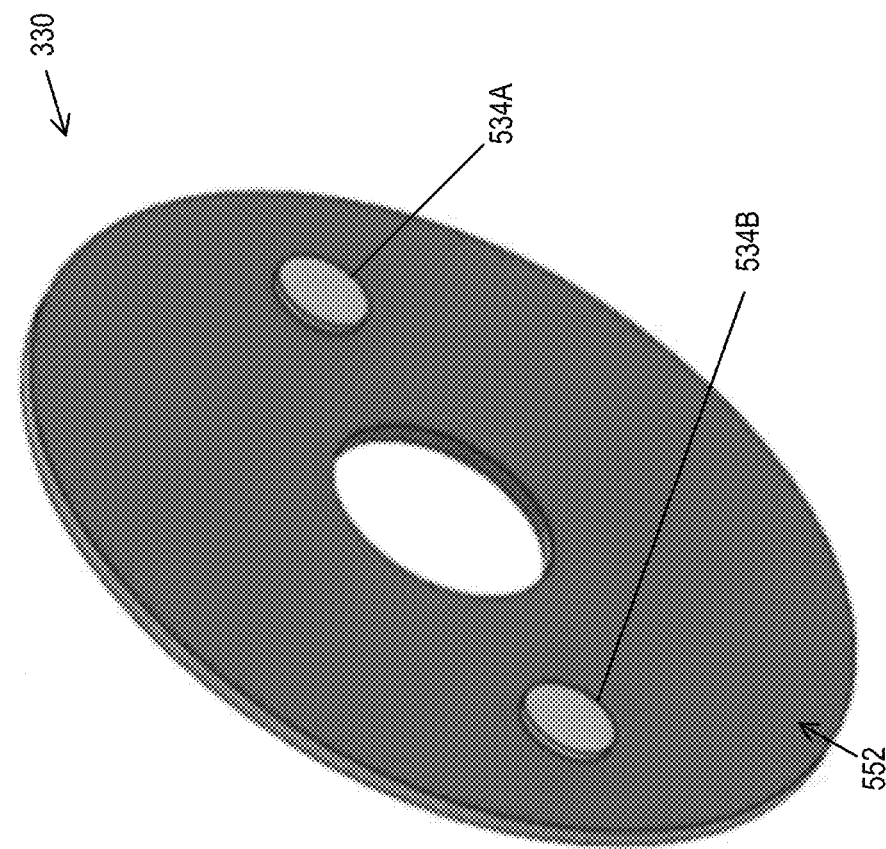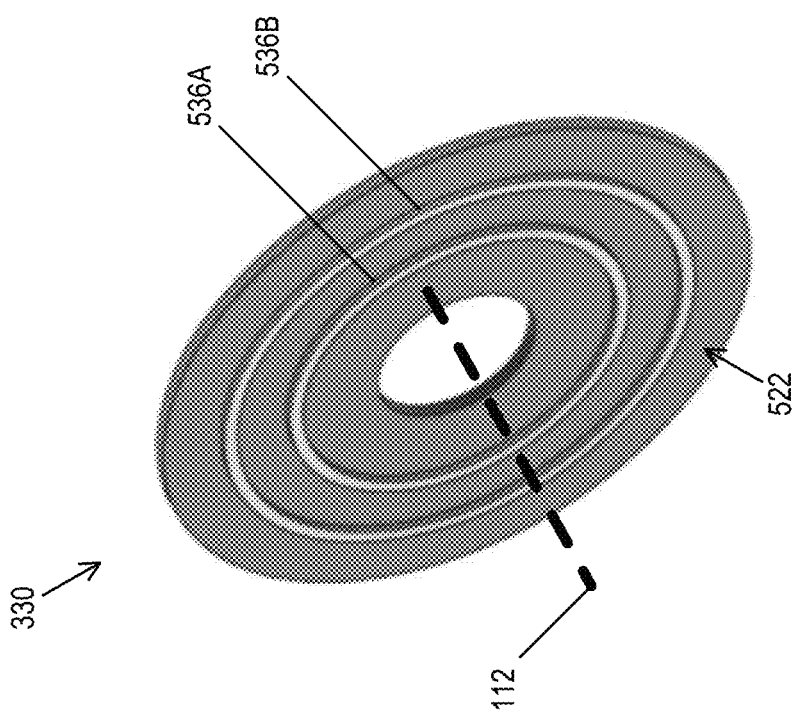
Fig. 5B
Fig. 5A

HAPTIC ROTARY INPUT

BACKGROUND

Current wearable devices, such as watches and virtual reality (VR) headsets, frequently utilize touchscreens and traditional vibration motors to provide feedback to users. However, these methods lack localized and precise haptic feedback, limiting the immersive and interactive experience for users. For example, these devices often vibrate the entire watch or headset, even when interaction with the device is limited to an individual component.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving haptic feedback in electronic devices.

In one aspect, a rotary input for an electronic device is provided. The rotary input comprises a housing, a haptic actuator, and a slip ring. The haptic actuator is engaged with the housing and configured to rotate about an axis passing through the electronic device responsive to a user action that manipulates the housing. The slip ring is configured to transfer electrical power from the electronic device to the haptic actuator.

In some aspects, the slip ring comprises a fixed plate, a rotating plate adjacent to the fixed plate, first terminals on the fixed plate that receive the electrical power from the electronic device, second terminals on the fixed plate that provide the electrical power to the rotating plate, third terminals on the rotating plate that receive the electrical power from the second terminals, and fourth terminals on the rotating plate that provide the electrical power to the haptic actuator. The first terminals are electrically connected with the second terminals and the third terminals are electrically connected with the fourth terminals.

In some aspects, the rotating plate rotates with the haptic actuator about the axis.

In some aspects, the third terminals are linear contacts that extend along respective rotational tracks about the axis and the second terminals are spring contacts that engage the linear contacts.

In some aspects, the second terminals are linear contacts that extend along respective rotational tracks about the axis and the third terminals are spring contacts that engage the linear contacts.

In some aspects, the fixed plate is a first printed circuit board and the rotating plate is a second printed circuit board.

In some aspects, the haptic actuator and the housing form at least one of a wheel, dial, knob, handle, arm, lever, or switch.

In some aspects, the rotary input further comprises a rotational sensor configured to sense rotation of the haptic actuator.

In some aspects, the rotational sensor is an optical sensor; and the haptic actuator comprises a stem having an augmented portion that changes a signal within the optical sensor during rotational measurement of the haptic actuator.

In some aspects, the augmented portion comprises one of a splined interface, gear teeth, or an optical pattern.

In some aspects, the stem extends through a center hole of the slip ring.

In some aspects, the housing removably engages the haptic actuator.

In some aspects, activation of the haptic actuator causes a rotation of the haptic actuator about the axis.

In some aspects, the activation causes a vibratory rotation of the haptic actuator about the axis.

In some aspects, activation of the haptic actuator causes a translational movement of the haptic actuator along the axis.

In some aspects, the activation causes a vibratory translation of the haptic actuator along the axis.

In another aspect, a wearable electronic device is provided. The wearable electronic device comprises a frame that supports a processor and a battery, and a rotary input. The rotary input has a housing, a haptic actuator, and a slip ring. The haptic actuator is engaged with the housing and configured to rotate about an axis passing through the frame responsive to a user action that manipulates the housing. The slip ring is configured to transfer electrical power from the electronic device to the haptic actuator.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In some aspects, the slip ring comprises a fixed plate, a rotating plate adjacent to the fixed plate, first terminals on the fixed plate that receive the electrical power from the electronic device, second terminals on the fixed plate that provide the electrical power to the rotating plate, third terminals on the rotating plate that receive the electrical power from the second terminals, and fourth terminals on the rotating plate that provide the electrical power to the haptic actuator. The first terminals are electrically connected with the second terminals and the third terminals are electrically connected with the fourth terminals. The rotating plate rotates with the haptic actuator about the axis.

In some aspects, the third terminals are linear contacts that extend along respective rotational tracks about the axis and the second terminals are spring contacts that engage the linear contacts.

In some aspects, the second terminals are linear contacts that extend along respective rotational tracks about the axis and the third terminals are spring contacts that engage the linear contacts.

BRIEF DESCRIPTION OF THE DRAWINGS/FIGURES

Non-limiting and non-exhaustive examples are described with reference to the following Figures.

FIGS. 5A and 5B show diagrams of an example rotating plate of the slip ring for the haptic feedback system of FIG. 1, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a haptic feedback system configured to provide localized feedback to a user of an electronic device, especially a wearable electronic device. In some aspects, the haptic feedback system comprises a haptic dial that delivers localized haptic feedback to a user's fingers while reducing or even eliminating vibration of the electronic device. Localized haptic feedback may enhance user interactions and provide more a more engaging and immersive interface for wearable devices such as watches, virtual reality headsets, or even mobile phones. In one examples, a rotary input for an electronic device comprises a housing, a haptic actuator engaged with the housing, and a slip ring configured to transfer electrical power from the electronic device to the haptic actuator. The haptic actuator is configured to rotate about an axis passing through the electronic device responsive to a user action that manipulates the housing.

Figure 1:
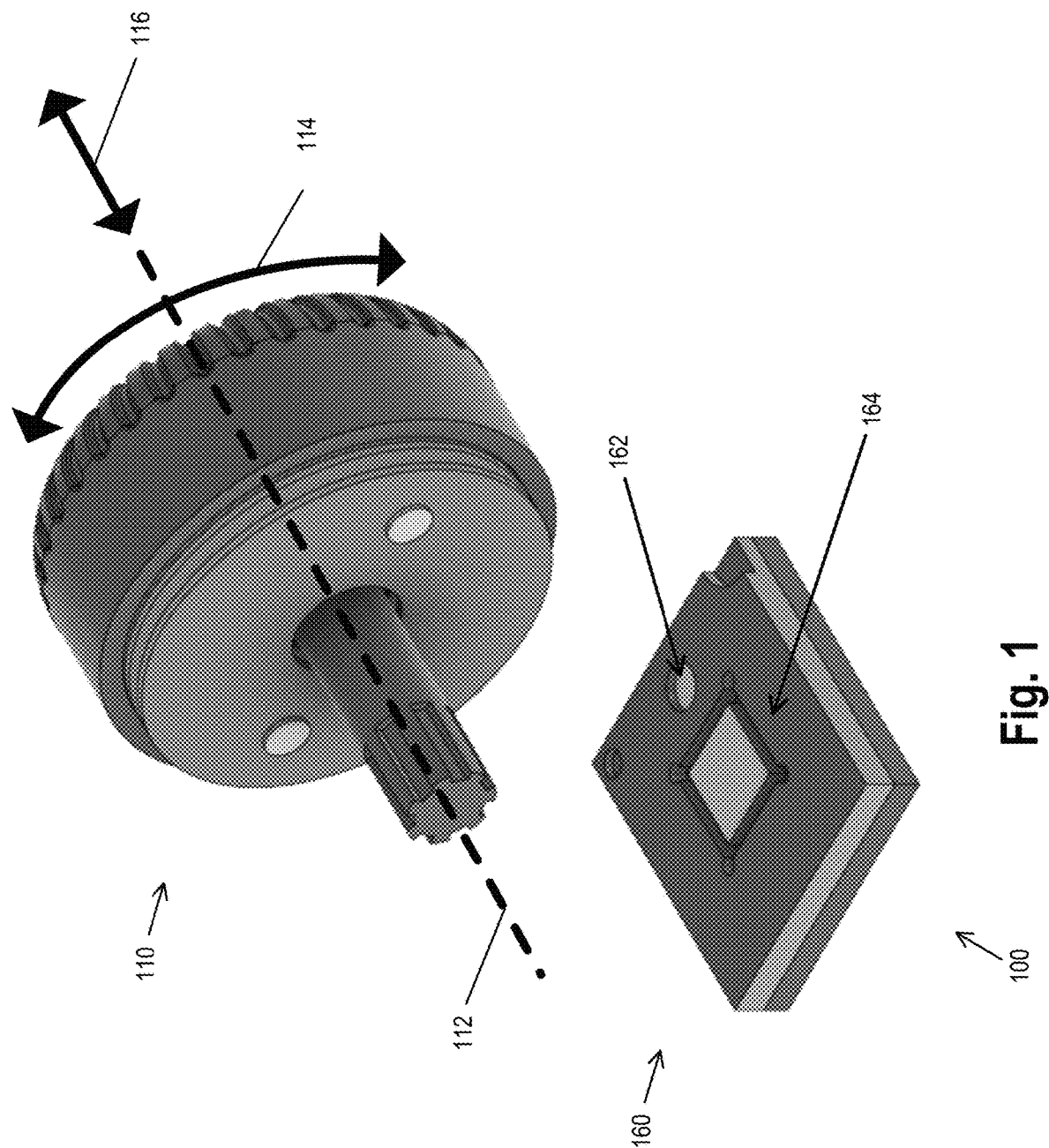
FIG. 1 shows a diagram of an example of a haptic feedback system, according to an example embodiment.

This and many further embodiments for a haptic system are described herein. For instance, FIG. 1 shows a diagram of an example of a haptic feedback system 100, according to an example embodiment. The haptic feedback system 100 comprises a rotary input 110 and a rotational sensor 160. Generally, a user may manipulate the rotary input 110 to cause a rotation of the rotary input 110 about an axis 112. The rotational sensor 160 senses and/or measures the rotation, for example, using an optical sensor 162 and a processor 164. Haptic feedback may be provided to the user by the rotary input 110, for example, via a haptic actuator 340 (FIG. 3) within the rotary input 110. In some examples, the haptic feedback is responsive to a user action, such as rotating the rotary input 110, tapping the rotary input 110, pulling the rotary input 110, etc. In other examples, the haptic feedback is responsive to some other suitable trigger, such as software running on an electronic device that comprises an instance of the rotary input 110.

The haptic feedback may be any suitable movement of the haptic actuator 340. In one example, activation of the haptic actuator 340 causes a rotation 114 of the haptic actuator (and thereby the rotary input 110) about the axis 112. In another example, activation of the haptic actuator 340 causes a vibratory rotation of the haptic actuator about the axis (i.e., alternative movement in a clockwise direction, counter-clockwise direction, clockwise direction, etc.). In yet another example, activation of the haptic actuator 340 causes a translational movement 116 of the haptic actuator 340 along the axis 112. In another example, activation of the haptic actuator 340 causes a vibratory translation of the haptic actuator 340 along the axis 112. Other examples of haptic feedback will be apparent to those skilled in the art.

Figure 2:
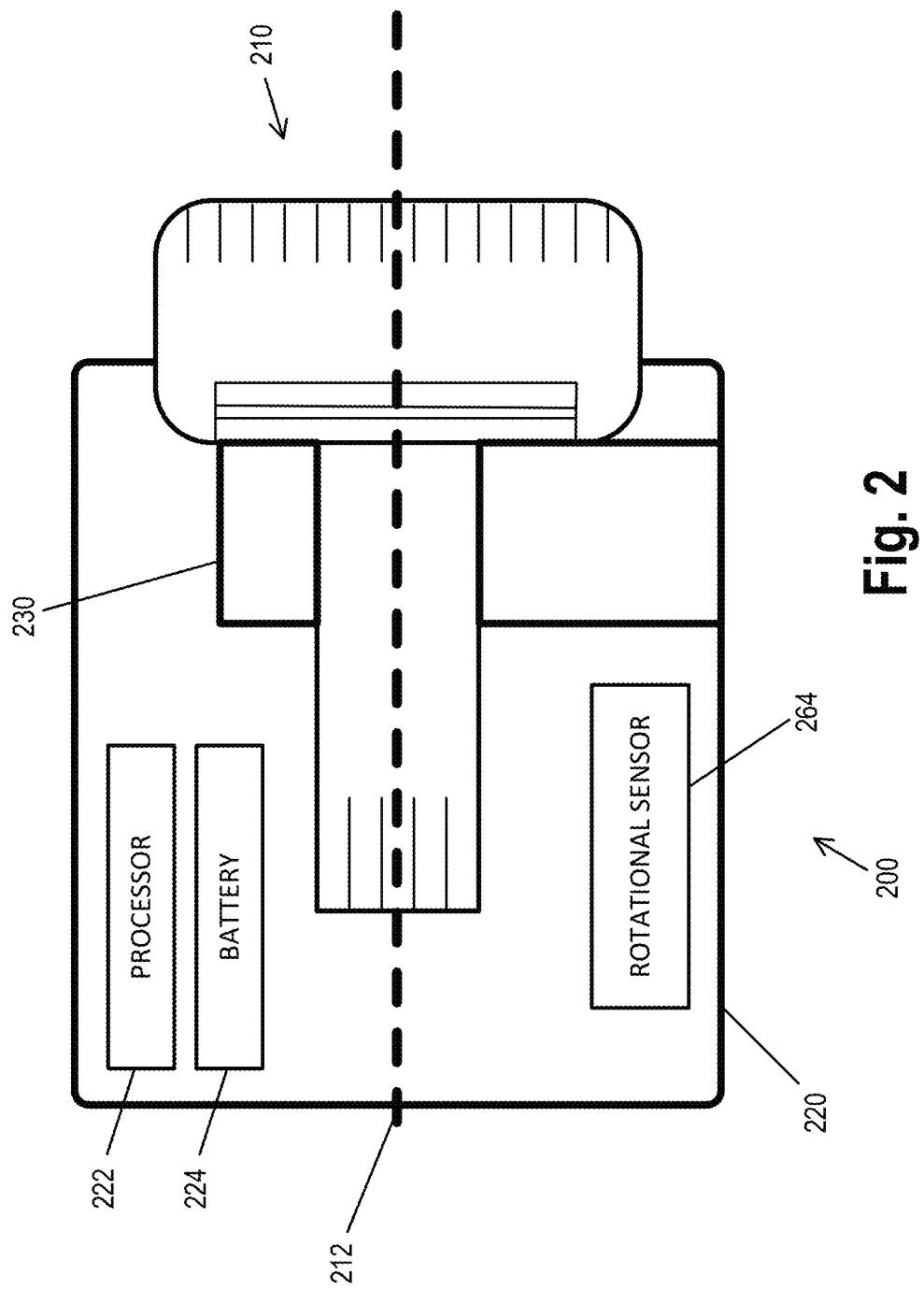
FIG. 2 shows a block diagram of an example electronic device for the haptic feedback system of FIG. 1, according to an example embodiment.

FIG. 2 shows a cross sectional block diagram of an example electronic device 200 for the haptic feedback system 100 of FIG. 1, according to an example embodiment. In the example shown in FIG. 2, a rotary input 210 is provided within the electronic device 200 and is rotatable about an axis 212. The electronic device 200 may be a wearable device, such as a smartwatch, wristband, headset (e.g., virtual reality headset or audio headset), or other suitable device. In other examples, the electronic device 200 may be any other suitable electronic device with which a user may interact with the rotary input 210, such as a smartphone, laptop computer, tablet, electric vehicle, stereo, television, appliance, etc.

The electronic device 200 comprises a frame 220, a processor 222, and a battery 224. Generally, the frame 220 provides structural support for the processor 222, the battery 224, the rotary input 210, and other components (not shown) of the electronic device 200. A rotational sensor 264 of the rotary input 210 may be contained within the frame 220, for example. The processor 222 may perform suitable processing tasks related to, for example, displaying images on a user display (not shown), communications with other devices (e.g., via Bluetooth or Wi-Fi), etc. The processor 222 may also determine suitable haptic feedback to be provided to the user and provide appropriate signals to the rotary input 210, as described below. The battery 224 provides electrical power to the electronic device 200 and may further provide electrical power to the rotary input 210, as described herein.

The electronic device 200 may also comprise a rotary input support 230 that is configured to support the rotary input 210. The rotary input support 230 may contain a bearing, bushing, or other mechanical coupling that provides rotational support to the rotary input 210. In some examples, the rotary input support 230 is configured to allow only rotational movement of the rotary input 210 about the axis 212. In other examples, the rotary input support 230 is configured to allow at least some translational movement in addition to the rotational movement. In some examples, the rotary input support 230 includes one or more electrical contacts for providing electrical power to the rotary input 210.

Figure 3:
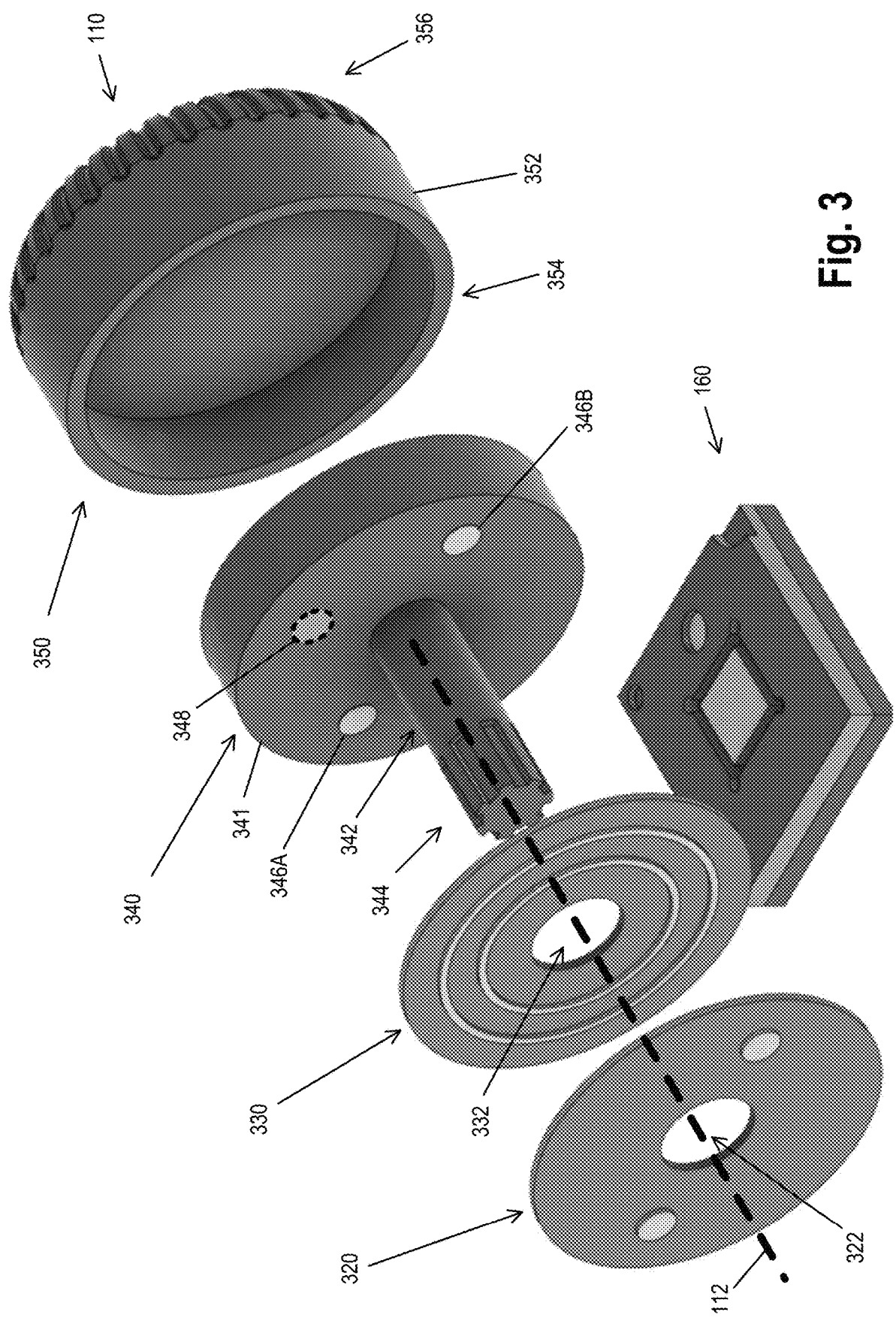
FIG. 3 shows an exploded diagram of the haptic feedback system of FIG. 1, according to an example embodiment.

FIG. 3 shows an exploded diagram of the haptic feedback system 100 of FIG. 1, according to an example embodiment. In the example shown in FIG. 3, the rotary input 110 comprises a fixed plate 320, a rotating plate 330, a haptic actuator 340, and a housing 350. The fixed plate 320 and the rotating plate 330 form at least a portion of a slip ring, where the slip ring is configured to transfer electrical power, for example, from the battery 224 to the haptic actuator 340.

The haptic actuator 340 comprises a main body 341 and a stem 342. The main body 341 of the haptic actuator 340 may be engaged with the housing 350, for example, by a snap-fit, press-fit, use of a screw or other fastener, or other suitable manner. In some examples, the housing 350 removably engages the haptic actuator 340, for example, to allow for customized housings 350 (e.g., different sizes, aesthetic patterns, colors, etc.). In the example shown in FIG. 3, the main body 341 is generally cylindrical, but other shapes may be used. In some examples, the main body 341 and the housing 350 are complementarily shaped to facilitate fitment of the housing 350 on the main body 341. For example, the housing 350 may comprise a shell 352 having an inner cavity 354 that is configured to engage the main body 341.

The shell 352 may have ridges 356, grooves, a knurl pattern, or other suitable frictional interface that facilitates user interaction with the housing 350. In some examples, the haptic actuator 340 and the housing 350 form at least one of a wheel, dial, knob, handle, arm, lever, or switch of the electronic device 200.

The haptic actuator 340 is configured to rotate about the axis 112 passing through the electronic device (e.g., electronic device 200) responsive to a user action that manipulates the housing 350, such as rotating the rotary input 110, tapping the rotary input 110, pulling the rotary input 110, etc. To facilitate rotation about the axis 112, the stem 342 extends along the axis 112. In some examples, the stem 342 engages a bearing, bushing, or other rotational interface of the electronic device 200, such as the rotary input support 230. To facilitate sensing of the rotation, the stem 342 may comprise an augmented portion 344 that changes a signal within the rotational sensor 160 during rotational measurement of the haptic actuator 340. For example, the augmented portion 344 may have one or more of a splined interface, gear teeth, an optical pattern, etc.

The fixed plate 320 and the rotating plate 330 each comprise a center hole (322, 332, respectively) through which the stem 342 protrudes. Generally, the fixed plate 320 and the rotating plate 330 have electrical contacts for transferring electrical power from the electronic device 200 to the haptic actuator 340. The haptic actuator 340 may have electrical contacts, such as terminals 346A and 346B for receiving electrical power. Although not shown, in some examples, additional signals may be transferred via the slip ring using additional electrical contacts. Such signals may be control signals, user interface signals (e.g., for buttons or sensors located on the rotary input 110), etc. Generally, the haptic actuator 340 uses the electrical power to cause a movement, vibration, etc. that may be perceived by the user, for example, via the user's fingertips as they manipulate the housing 350. The haptic actuator 340 may comprise an actuator 348, such as a linear resonant actuator, eccentric rotating mass actuator, piezo actuator, or other suitable actuator.

Figure 4B:
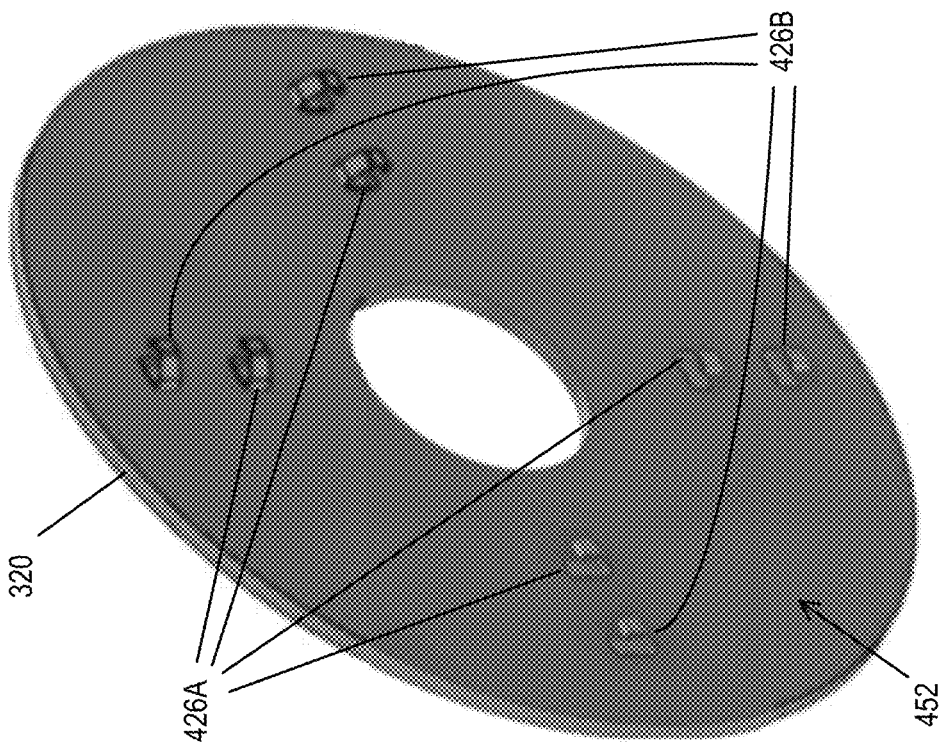
FIGS. 4A and 4B show diagrams of an example fixed plate of a slip ring for the haptic feedback system of FIG. 1, according to an example embodiment.
Figure 4A:
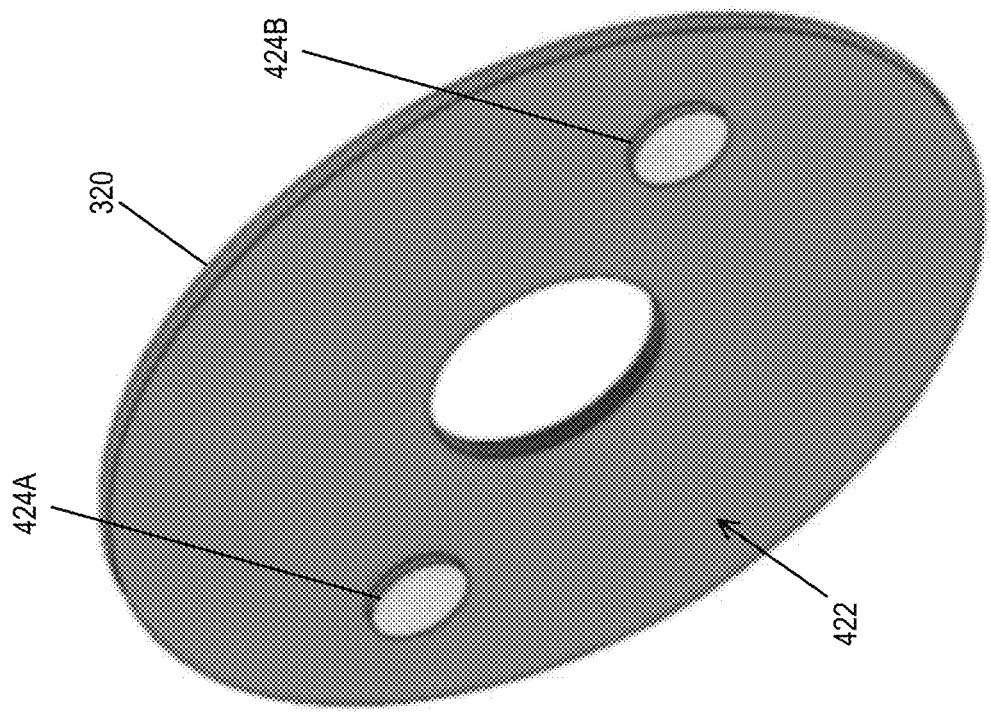

FIGS. 4A and 4B show diagrams of an example fixed plate 320 of a slip ring for the haptic feedback system 100 of FIG. 1, according to an example embodiment. FIG. 4A shows a first face 422 of the fixed plate 320, while FIG. 4B shows a second face 452 of the fixed plate 320. The first face 422 comprises first terminals 424A and 424B, while the second face 452 comprises second terminals 426A and 426B. Generally, the first terminal 424A is electrically coupled with the second terminals 426A, while the first terminal 424B is electrically coupled with the second terminals 426B. The first face 422 may abut and/or engage the electronic device 200 to receive electrical power via the first terminals 424. In this way, the first terminals 424 may receive electrical power from the electronic device 200 and the second terminals 426 may provide the electrical power to the rotating plate 330, as described herein. In some examples, the fixed plate 320 is formed as a printed circuit board.

FIGS. 5A and 5B show diagrams of an example rotating plate 330 of the slip ring for the haptic feedback system 100 of FIG. 1, according to an example embodiment. FIG. 5A shows a first face 522 of the rotating plate 330, while FIG. 5B shows a second face 552 of the rotating plate 330. Generally, the rotating plate 330 rotates with the haptic actuator 340 about the axis 112.

The first face 522 comprises third terminals 536A and 536B, while the second face 552 comprises fourth terminals 534A and 534B. Generally, the third terminal 536A is electrically coupled with the fourth terminal 534A, while the third terminal 536B is electrically coupled with the fourth terminals 534B. In this way, the third terminals 536 may receive electrical power from the electronic device 200 (via the second terminals 426 of the fixed plate 320) and the fourth terminals 534 may provide the electrical power to the haptic actuator 340 via the terminals 346A and 346B. In some examples, the rotating plate 330 is formed as a printed circuit board.

Figure 6:
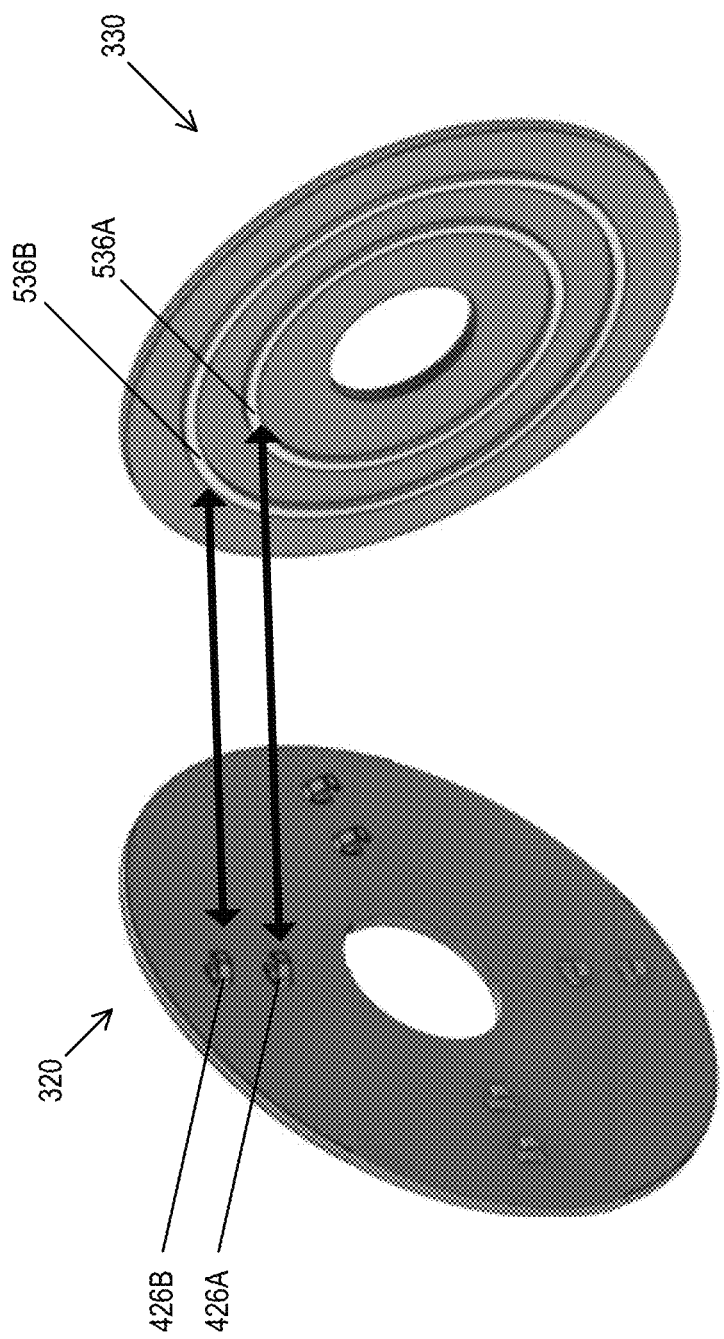
FIG. 6 shows a diagram of the fixed plate and the rotating plate of the slip ring for the haptic feedback system of FIG. 1, according to an example embodiment.

FIG. 6 shows a diagram of the fixed plate 320 and the rotating plate 330 of the slip ring for the haptic feedback system 100 of FIG. 1, according to an example embodiment. The fixed plate 320 may be fixed to the electronic device 200, for example, via the rotary input support 230. However, a rotational engagement of the fixed plate 320 and the rotating plate 330 is configured to allow electrical power to pass between them. As one example, FIG. 5A shows the third terminals 536 implemented as linear contacts that extend along respective rotational tracks about the axis 112. As shown in FIG. 4B, the corresponding second terminals 426 are implemented as spring contacts that engage the linear contacts. More specifically, the terminals 426A engage the terminals 536A and the terminals 426B engage the terminals 536B. As the rotating plate 330 rotates about the axis 112, the spring contacts may ensure consistent contact against the linear contacts, providing uninterrupted power and haptic feedback. Although only two tracks are shown, the second and third contacts may be implemented as one, three, four, or more tracks in other examples.

Figure 7:
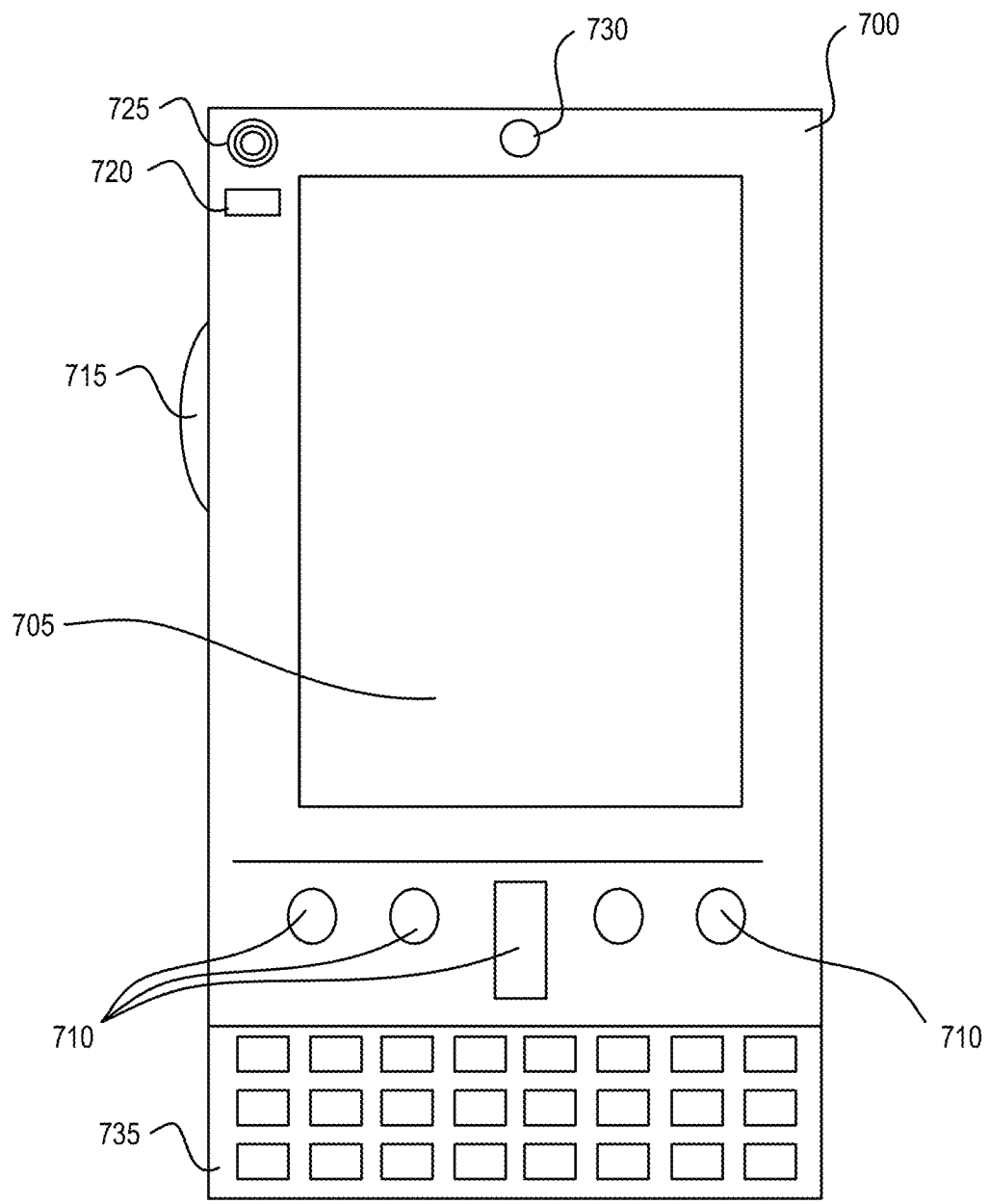
FIGS. 7 and 8 are simplified block diagrams of a mobile computing device with which aspects of the present disclosure may be practiced.
Figure 8:
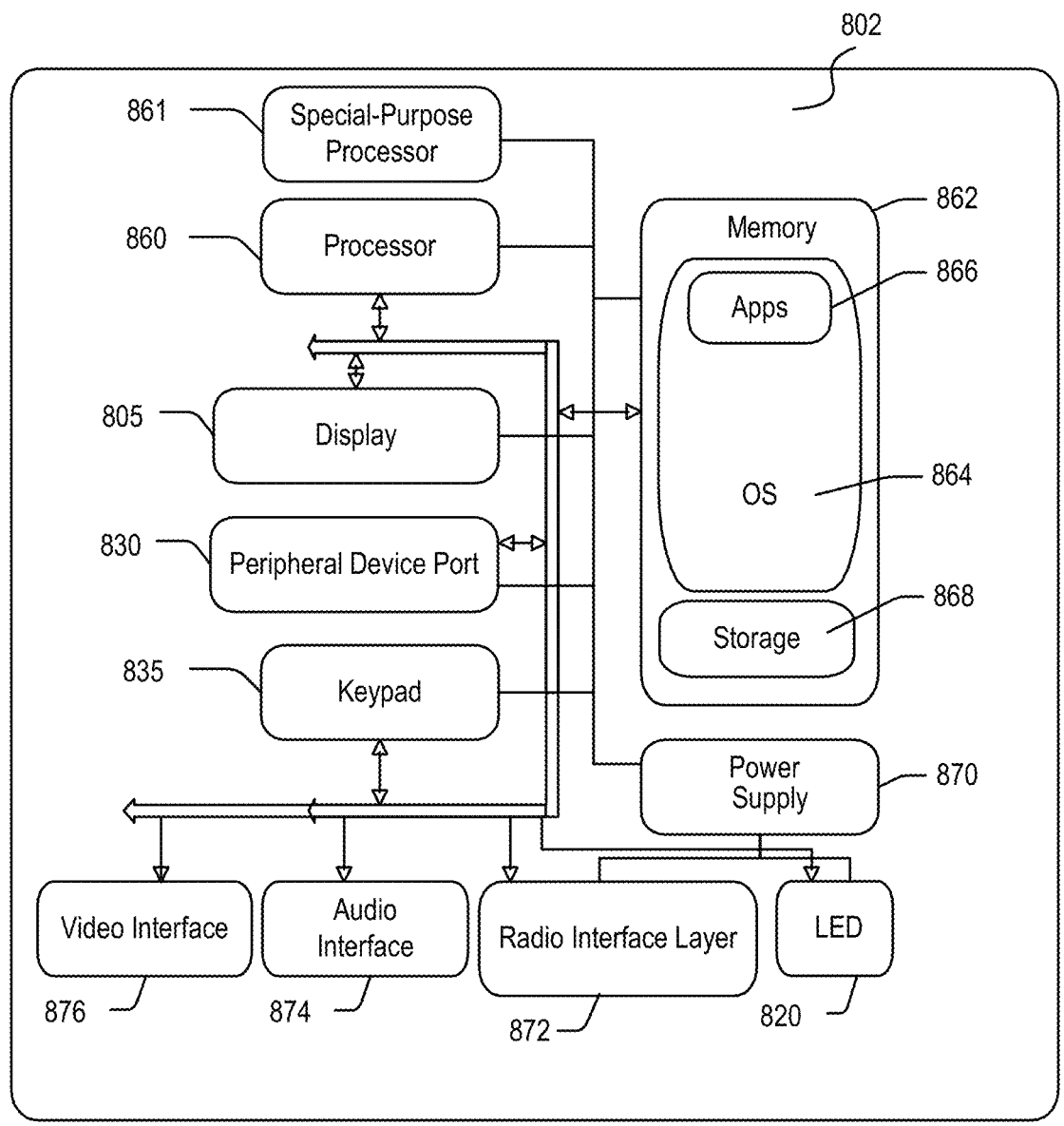

FIGS. 7 and 8 and the associated descriptions provide a discussion of a variety of operating environments in which aspects of the disclosure may be practiced. However, the devices and systems illustrated and discussed with respect to FIGS. 7 and 8 are for purposes of example and illustration and are not limiting of a vast number of computing device configurations that may be utilized for practicing aspects of the disclosure, as described herein.

FIGS. 7 and 8 illustrate a mobile computing device 700, for example, a mobile telephone, a smart phone, wearable computer (such as a smart watch), a headset, a handheld controller, a tablet computer, a laptop computer, and the like, with which embodiments of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated embodiment, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A rotary input for an electronic device, the rotary input comprising:
   a housing;
   a haptic actuator engaged with the housing, the haptic actuator being configured to rotate about an axis passing through the electronic device responsive to a user action that manipulates the housing; and a slip ring configured to transfer electrical power from the electronic device to the haptic actuator, wherein the slip ring comprises:
a fixed plate;
a rotating plate adjacent to the fixed plate; and
a plurality of terminals coupled to the fixed plate or the rotating plate.

2. The rotary input of claim 1, wherein the plurality of terminals comprises:
first terminals on the fixed plate that receive the electrical power from the electronic device,
second terminals on the fixed plate that provide the electrical power to the rotating plate,
third terminals on the rotating plate that receive the electrical power from the second terminals, and
fourth terminals on the rotating plate that provide the electrical power to the haptic actuator;
wherein the first terminals are electrically connected with the second terminals and the third terminals are electrically connected with the fourth terminals.

3. The rotary input of claim 1, wherein the rotating plate rotates with the haptic actuator about the axis.

4. The rotary input of claim 3, wherein the third terminals are linear contacts that extend along respective rotational tracks about the axis and the second terminals are spring contacts that engage the linear contacts.

5. The rotary input of claim 3, wherein the second terminals are linear contacts that extend along respective rotational tracks about the axis and the third terminals are spring contacts that engage the linear contacts.

6. The rotary input of claim 3, wherein the fixed plate is a first printed circuit board and the rotating plate is a second printed circuit board.

7. The rotary input of claim 3, wherein the haptic actuator and the housing form at least one of a wheel, dial, knob, handle, arm, lever, or switch.

8. The rotary input of claim 3, wherein the rotary input further comprises a rotational sensor configured to sense rotation of the haptic actuator.

9. The rotary input of claim 8, wherein:
the rotational sensor is an optical sensor; and
the haptic actuator comprises a stem having an augmented portion that changes a signal within the optical sensor during rotational measurement of the haptic actuator.

10. The rotary input of claim 9, wherein the augmented portion comprises one of a splined interface, gear teeth, or an optical pattern.

11. The rotary input of claim 9, wherein the stem extends through a center hole of the slip ring.

12. The rotary input of claim 1, wherein the housing removably engages the haptic actuator.

13. The rotary input of claim 1, wherein activation of the haptic actuator causes a rotation of the haptic actuator about the axis.

14. The rotary input of claim 13, wherein the activation causes a vibratory rotation of the haptic actuator about the axis.

15. The rotary input of claim 1, wherein activation of the haptic actuator causes a translational movement of the haptic actuator along the axis.

16. The rotary input of claim 15, wherein the activation causes a vibratory translation of the haptic actuator along the axis.

17. A wearable electronic device, comprising:
a frame that supports a processor and a battery;
a rotary input having:
a housing,
a haptic actuator engaged with the housing, the haptic actuator being configured to rotate about an axis passing through the frame responsive to a user action that manipulates the housing, and
a slip ring configured to transfer electrical power from the electronic device to the haptic actuator,
wherein the slip ring comprises:
a fixed plate;
a rotating plate adjacent to the fixed plate; and
a plurality of terminals coupled to the fixed plate or the rotating plate.

18. The wearable electronic device of claim 17, wherein the plurality of terminals comprises:
first terminals on the fixed plate that receive the electrical power from the electronic device,
second terminals on the fixed plate that provide the electrical power to the rotating plate,
third terminals on the rotating plate that receive the electrical power from the second terminals, and
fourth terminals on the rotating plate that provide the electrical power to the haptic actuator;
wherein the first terminals are electrically connected with the second terminals and the third terminals are electrically connected with the fourth terminals; and
wherein the rotating plate rotates with the haptic actuator about the axis.

19. The rotary input of claim 18, wherein the third terminals are linear contacts that extend along respective rotational tracks about the axis and the second terminals are spring contacts that engage the linear contacts.

20. The rotary input of claim 18, wherein the second terminals are linear contacts that extend along respective rotational tracks about the axis and the third terminals are spring contacts that engage the linear contacts.

* * * * *